G. A. LAVOIE.
ROTARY BOOKCASE.
APPLICATION FILED NOV. 4, 1910.
1,013,664.
Patented Jan. 2, 1912.
2 SHEETS—SHEET 1.
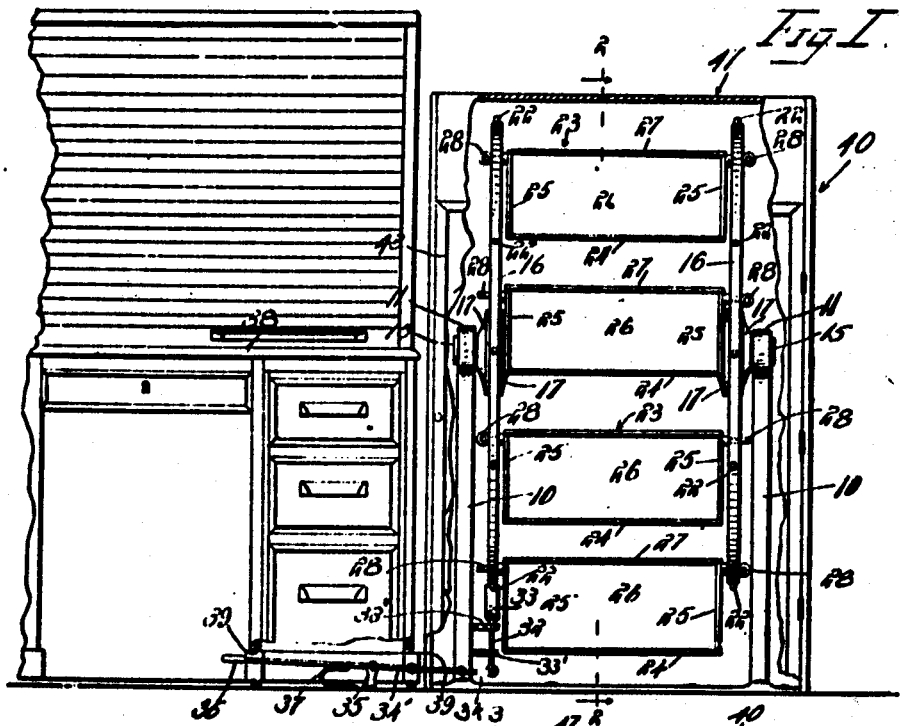
Fig. 1
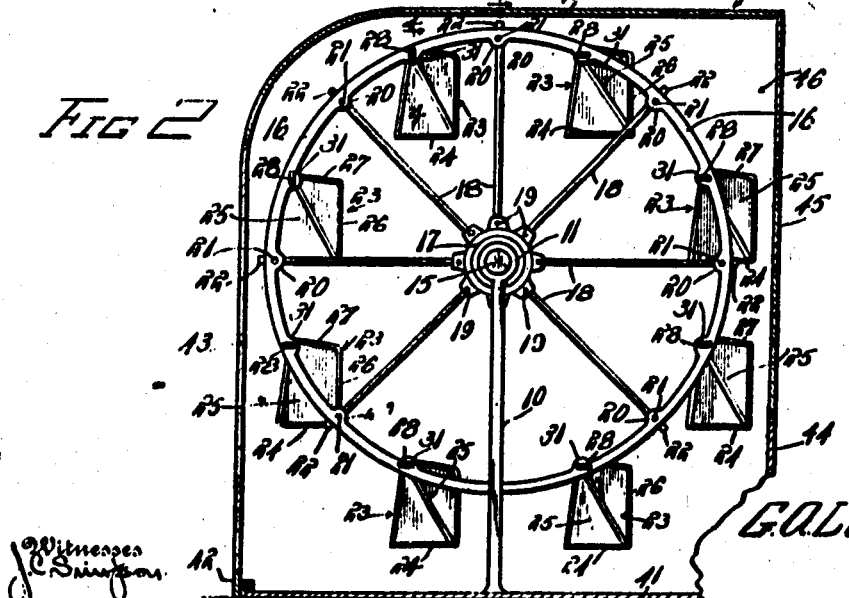
Fig. 2
Witnesses
J. C. Sningson
Francis Boyle
Inventor
G. A. Lavoie.
Attorneys G. A. LAVOIE.
ROTARY BOOKCASE.
APPLICATION FILED NOV. 4, 1910.
1,013,664. Patented Jan. 2, 1912.
2 SHEETS—SHEET 2.
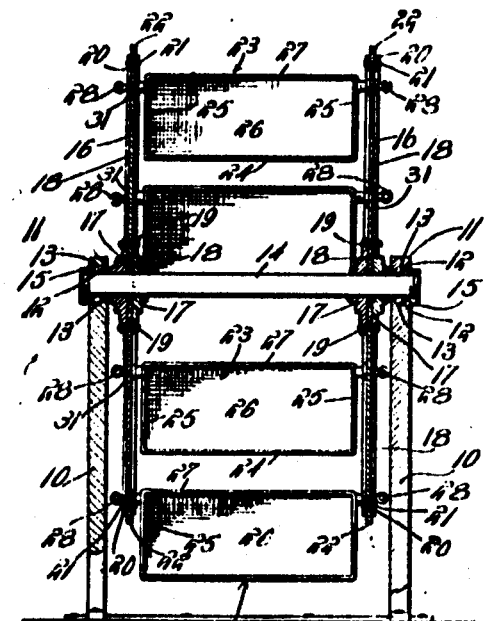
Fig. 3.
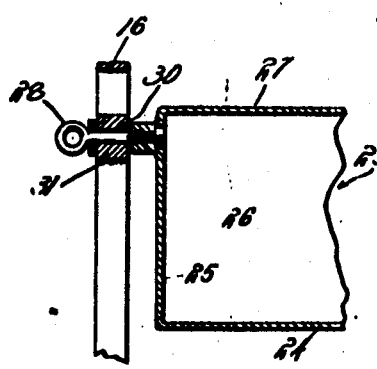
Fig. 4.
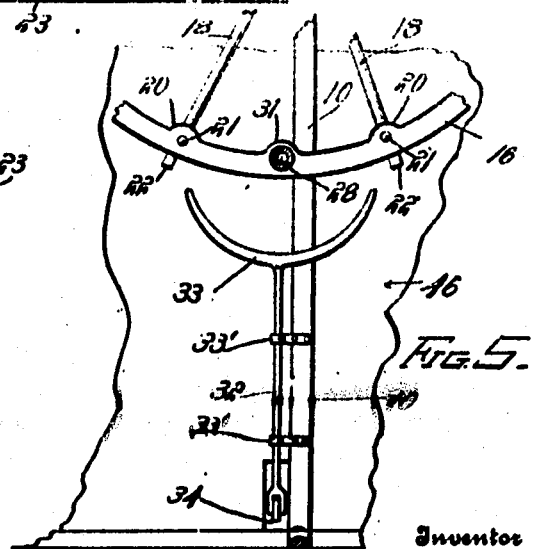
Fig. 5.
Inventor
G. A. Lavoie.
Attorneys

UNITED STATES PATENT OFFICE.

GERMAIN A. LAVOIE, OF GLACE BAY, NOVA SCOTIA, CANADA.

ROTARY BOOKCASE.

1,013,664.  Specification of Letters Patent.  Patented Jan. 2, 1912.

Application filed November 4, 1910.  Serial No. 590,710.

*To all whom it may concern:*

Be it known that I, GERMAIN A. LAVOIE, a subject of the King of Great Britain, residing at Glace Bay, in the Province of Nova Scotia, Dominion of Canada, have invented certain new and useful Improvements in Rotary Bookcases; and I do hereby declare the following to be a full, clear, and exact description of the invention, such as will enable others skilled in the art to which it appertains to make and use the same.

This invention relates to rotary bookcases designed to be used in connection with writing desks.

The object of the present invention is to provide a rotary bookcase in the nature of a Ferris wheel, novel means being employed to check the rotation of the wheel at any desired point, this means being operated by a treadle within convenient reach of the foot of a person sitting at the desk.

In the accompanying drawings, forming part of this specification:—Figure 1 is a front elevation of the bookcase and a desk, with portions of both broken away. Fig. 2 is a cross sectional view taken on the line 2—2, Fig. 1. Fig. 3 is a transverse sectional view through the line 3—3, Fig. 2, with the casing removed. Fig. 4 is an enlarged fragmentary sectional view taken on the line 4—4, Fig. 2. Fig. 5 is an enlarged fragmentary cross sectional view showing the pawl in released position.

Referring now to the drawing, the bookcase is seen to comprise a pair of spaced pedestals 10, the upper ends of which are formed with bearing boxes 11, within which are arranged ball races 12 which receive bearing balls 13.

Mounted for rotation in the bearings is a horizontally disposed shaft 14, the ends of which extend beyond the bearings and are equipped with retaining nuts 15 or similar devices for preventing disengagement of the shaft. Arranged adjacent the opposite end portions of the shaft are wheels 16, each of which comprises a hub formed of similar disk like halves 17, the opposing flat faces of these halves being formed with suitable orifices that receive the inner ends of spokes 18, pins 19 being inserted transversely through the spokes and halves of the hub to secure the parts together. Each hub is fixed in any preferred manner to the shaft and rotates therewith. Arranged adjacent to the outer ends of the spokes of each wheel is a rim formed of a pair of similar annuli 20, these annuli being preferably rectangular in cross section and being arranged to clamp the spokes between their opposing flat faces, pins 21 being passed transversely through the annuli and spokes to secure the parts together. The rim thus formed is arranged as above stated adjacent to the extreme free ends of the spokes so that a portion of each spoke projects beyond the outer periphery of the rim and forms a ratchet tooth 22, the purpose of which will presently appear.

Arranged to span the space between the wheels are swinging book shelves 23, each comprising a bottom 24 from the side edges of which rise side walls 25, and from the rear edge of which rises a back wall 26, the top edges of the side and back walls being connected by a top wall 27. Threaded into bosses formed on the upper leading corners of the side walls are set screws 28, these set screws being loosely engaged through suitable alined openings 30 formed in semicircular oppositely arranged lugs 31, which depend from the inner peripheries of the annuli composing the rim. Each book shelf is thus swivelly connected to the rim of the wheel and it will be observed that each shelf is situated approximately midway between the outer ends of adjacent spokes, this construction permitting of the shelves being cushioned against shock by virtue of the slightly yielding tendencies of that portion of the wheel rim between adjacent spokes.

In removing or replacing books upon the shelves the wheel rim is grasped by the hand and rotated until the open front end of the desired shelf confronts the operator, and for stopping the rotation of the device at this moment without retaining the grasp upon the wheel, the following construction is employed: Arranged below and confronting the rim of one of the wheels is a vertically disposed link 32, this link being equipped at its upper end with a bowed pawl head 33, the extremities of which engage the rim of the wheel adjacent to the roots of neighboring ratchet teeth, these free ends being so spaced that when the pawl is in engaged position there will be but very little play between the pawl and ratchet teeth so that oscillation of the wheel will be prevented. The link is guided in its movement by eyes 33′, these eyes projecting from the inner side of one of the pedestals 10 as shown. The lower end of the link 32 is pivotally connected to a rock lever 34 carried by a lever 34', this lever being arranged to project laterally from the wheel and transversely across the wheel as shown in Fig. 1. The lever is fulcrumed upon a post 35 and terminates at its free extremity in a treadle 36. A leaf spring 37 is interposed between the free end portion of the lever and the floor and operates to normally hold the pawl head in engagement with the ratchet teeth. The operator depresses the treadle 36 against the pressure of the spring 37, thereby moving the pawl out of engagement with the ratchet teeth when it is desired to rotate the wheel so as to expose any particular shelf. Upon the removal of the foot from the treadle, the spring will return the pawl to its engaged position so that the wheel will be held against rotation.

The bookcase as above stated is designed to be used in connection with a desk, the same in this instance being designated by the numeral 38, and it will be observed that the lever 34 is passed through slots 39 formed in the base edges of the desk walls, this construction permitting of the treadle 36 being at all times within convenient reach of the foot of a person using the desk.

It is desirable that the book shelves should be shielded from dust and other foreign matter, and to attain this end a wooden, metal or similar housing or casing 40 is arranged over the rotary shelves, this casing comprising a bottom 41 which supports the pedestals 10 and from the front edge of this bottom rises a front wall 42 which is provided with a glass door 43 to permit access to the shelves. From the rear edge of the bottom wall rises a rear wall 44 which is equipped with a glass door 45 which permits of access to the backs of the book shelves for dusting and the like. From the side edges of the bottom rise side walls 46, the top edges of the front, side and rear walls being connected by a top wall 47.

What is claimed is:

A rotary bookcase including standards having bearing boxes, a shaft journaled in said bearing boxes, spaced wheels on said shafts having radially arranged projections on their rims forming ratchet teeth, a treadle arranged transversely the rim of one of said wheels, a stand link loosely secured to said treadle and having one end equipped with an arcuate pawl the branches of which are adapted to bear upon the rim of the last named wheel and operatively engaged said ratchet teeth.

In testimony whereof, I affix my signature, in presence of two witnesses.

GERMAIN A. LAVOIE.

Witnesses:
ALLAN J. MACDONALD,
E. M. STANLEY.